United States Patent
Hara

(10) Patent No.: US 7,889,971 B2
(45) Date of Patent: Feb. 15, 2011

(54) METHOD, APPARATUS, AND PROGRAM FOR IMAGE FILING

(75) Inventor: Shoji Hara, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 2385 days.

(21) Appl. No.: 10/121,662

(22) Filed: Apr. 15, 2002

(65) Prior Publication Data

US 2002/0150391 A1 Oct. 17, 2002

(30) Foreign Application Priority Data

Apr. 13, 2001 (JP) .............................. 2001-114752

(51) Int. Cl.
*H04N 5/77* (2006.01)
*H04N 5/84* (2006.01)
*H04N 5/89* (2006.01)

(52) U.S. Cl. ...................................... 386/224; 386/334

(58) Field of Classification Search ..................... 386/1, 386/85–87, 125–126, 95–96, 45–46, 68, 386/83; 369/47.23, 30.05, 30.07, 47.13; 700/94

See application file for complete search history.

(56) References Cited

U.S. PATENT DOCUMENTS

| 5,036,490 A | * | 7/1991 | Kajimura et al. ............. 369/126 |
| 5,068,745 A | | 11/1991 | Shimura |
| 5,287,420 A | * | 2/1994 | Barrett ........................ 382/233 |
| 6,642,939 B1 | * | 11/2003 | Vallone et al. ............... 715/721 |
| 6,819,864 B2 | * | 11/2004 | Fujita et al. .................... 386/46 |

FOREIGN PATENT DOCUMENTS

| JP | 2-263269 | 10/1990 |
| JP | 10-091767 A | 4/1998 |

* cited by examiner

*Primary Examiner*—Thai Tran
*Assistant Examiner*—Nigar Chowdhury
(74) *Attorney, Agent, or Firm*—Sughrue Mion, PLLC

(57) ABSTRACT

In the case where an image data set stored in a recording medium of an image server or the like is linked to a Web page, an error message is prevented from being shown even if the image data set is deleted. Confirmation means confirms a storage period for the image data set. If the storage period has expired, character image generation means generates a character image data set of the same format and having the same file name as the image data set. The character image represented by the character image data set indicates deletion of the image data set. Compression means compresses the image data set and the compressed image data set is stored in another recording medium. The image data set is then deleted. When an access to the image data set is attempted, the character image data set is referred to.

18 Claims, 4 Drawing Sheets

FIG. 2

FILE XXXX HAS BEEN DELETED.

PLEASE CONTACT YYYY FOR RESTORATION.

FILE XXXX HAS BEEN DELETED.

PLEASE CONTACT YYYY FOR RESTORATION.

P

METHOD, APPARATUS, AND PROGRAM FOR IMAGE FILING

BACKGROUND OF THE INVENTION

1. Field of the Invention

The present invention relates to an image filing method and an image filing apparatus for storing image data in a recording medium such as a hard disc and to a program that causes a computer to execute the image filing method.

2. Description of the Related Art

As one form of digital photograph service, network photograph service systems are known. In a network photograph service system, digital images owned by users are stored in an image server and printing orders or the like are received via a network such as the Internet.

In such a system, when registration of digital images is requested from a laboratory at the time of film development or the like, images recorded on a film are read by a film scanner and stored in an image server as digital image data. The image data can be viewed on a network. Moreover, image data obtained by digital cameras can also be stored in the image server. A user can receive various kinds of services such as browsing through the images that have been registered or placing a printing order regarding the images, by accessing the system of a service provider via the network.

Meanwhile, an image data set stored in an image server can be linked to a Web page generated by a user. In this manner, the image data set can be accessed via the Web page according to a function of Web browser software.

Each image server that stores image data sets has a limited image-data storage space. Therefore, in the case where the space would become fully used if an image data set were newly stored in the image server, some of the image data sets that have already been stored therein need to be deleted. For this reason, an image data storing method has been proposed (Japanese Unexamined Patent Publication No. 2(1990)-263269). In this method, a storage period is specified for each image data set. An image data set whose storage period has expired is compressed at a high compression rate to be stored in another recording medium while being deleted from an image server.

In the case where an image data set stored in an image server is linked to a Web page as has been described above, the image data set cannot be referred to from the Web page when the image data set is deleted from the image server. Therefore, Web browser software displays an error message such as "File Not Found". In this case, if a person in charge of managing the Web page manages the storage period or expiration date for the image data set, the link can be changed or a message indicating deletion of the image data set can be shown in the Web page, for example. However, if the person is not aware of the storage period or the expiration date, the error message "File Not Found" continues to be displayed, which is not preferable. For this reason, it can be proposed to continuously store each image data set in the image server. However, due to the limited image-data storage space, the storage space cannot be increased and eventually, a new image data set cannot be stored in the image server if the existing image data sets remain.

SUMMARY OF THE INVENTION

The present invention has been conceived based on consideration of the above circumstances. An object of the present invention is therefore to secure a storage space in an image server while preventing display of an error message.

An image filing method of the present invention is an image filing method for managing storage of an image data set in a recording medium, and the image filing method comprises the steps of:

generating a character image data set representing a character image in the same format and having the same file name as the image data set, when the image data set is deleted; and storing the character image data set in the recording medium instead of the image data set.

In the image filing method of the present invention, it is preferable for the image data set to be compressed to generate a compressed image data set so that the compressed image data set is stored in another recording medium.

The image data set is deleted after a predetermined storage period has elapsed since recording of the image data set in the recording medium or at the time access frequency decreases to a predetermined value or smaller, for example.

The character image represents an image comprising characters. The content of the characters preferably includes a message indicating expiration of storage of the image data set, a message indicating deletion of the image data set, the file name of the image data set and/or an address for accessing the image data set, for example. A thumbnail image generated from reduction of the image represented by the deleted image data set may be also included in the character image.

An image filing apparatus of the present invention is an image filing apparatus for managing storage of an image data set in a recording medium, and the image filing apparatus comprises:

character image generation means for generating a character image data set representing a character image in the same format and having the same file name as the image data set when the image data set is deleted; and control means for storing the character image data set in the recording medium instead of the image data set.

It is preferable for the image filing apparatus of the present invention to further comprise:

compression means for generating a compressed image data set while compressing the image data set to be deleted; and another recording medium for storing the compressed image data set.

The image filing method of the present invention may be provided as a program that causes a computer to execute the image filing method.

According to the present invention, the character image data set representing the character image is generated in the same format and in the same file name as the image data set to be deleted. The character image data set is stored in the recording medium instead of the image data set. Therefore, in the case where the deleted image data set has been linked to a Web page, the character image data set is accessed and the character image is displayed by Web browser software, even if a webmaster of the Web page does not rewrite the Web page. Consequently, no error message is displayed and a person who tried to access the image data set can learn of the deletion of the image data set.

Since the data amount of the character image data set is far smaller than the data amount of the image data set, a storage space of the recording medium is not consumed considerably by storing the character image data set in the recording medium. Therefore, the storage space can remain large enough for further image data storage.

BRIEF DESCRIPTION OF THE DRAWINGS

FIG. 2 shows a character image represented by a character image data set (case 1);

DESCRIPTION OF THE PREFERRED EMBODIMENT

Figure 1:
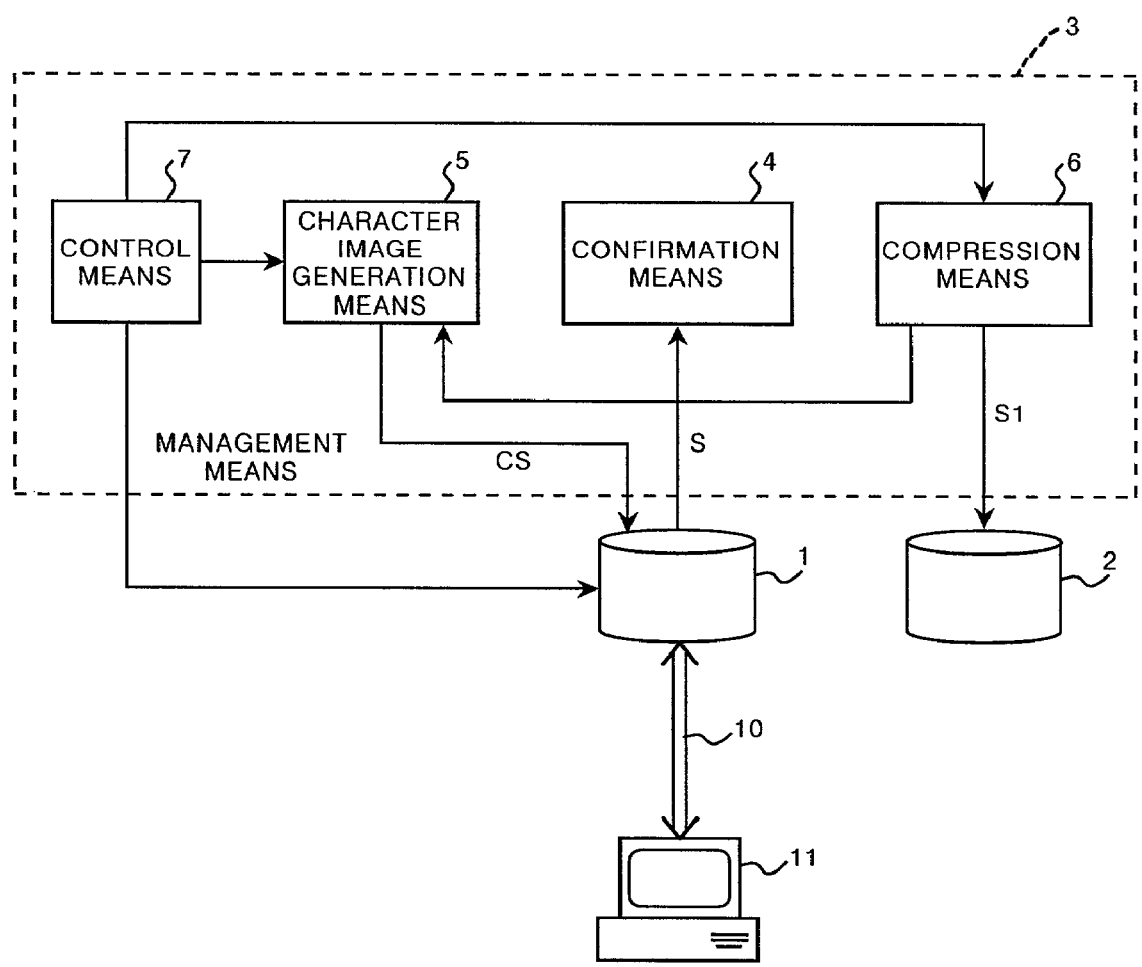
FIG. 1 is a block diagram showing a configuration of an image filing apparatus of an embodiment of the present invention.

Hereinafter, an embodiment of the present invention will be explained with reference to the accompanying drawings. FIG. 1 is a block diagram showing a configuration of an image filing apparatus of this embodiment. As shown in FIG. 1, the image filing apparatus of this embodiment comprises a first recording medium 1 such as a hard disc for storing an image data set S, a second recording medium 2 such as a magnetic tape for semi-permanently storing the image data set S after compression of the image data set S, and management means 3 for managing a storage period for the image data set S.

The management means 3 comprises confirmation means 4 for confirming the storage period for the image data set S (such as 3 months after recording in the first recording medium 1), character image generation means 5 for generating a character image data set CS of the same format and having the same file name as the image data set S whose storage period has expired, compression means 6 for generating a compressed image data set S1 by compression of the image data set S, and control means 7 for controlling the first recording means 1, the character image generation means 5, and the compression means 6 to delete the image data set S from the first recording medium 1, record the compressed image data set S1 in the second recording medium 2, and store the character image data set CS in the first recording means 1.

The first recording means 1 is accessible from a terminal 11 such as a personal computer via a network 10. Therefore, if the image data set S stored in the first recording medium 1 is linked to a Web page being displayed on the terminal 11 by Web browser software, the Web browser software can display the image data set S stored in the first recording medium 1 on the terminal 11.

Figure 3:
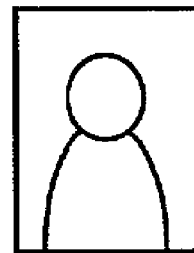
FIG. 3 shows a character image represented by a character image data set (case 2)

The character image generation means 5 generates the character image data set CS of the same format and having the same file name as the image data set S by using prepared font images, when the image data set S having the expired storage period is deleted. For example, if the image data set S to be deleted is of JPEG format and has a file name "F001.jpg", the character image data set CS is also of JPEG format and has the file name "F001.jpg". It is preferable for the character image data set CS to represent a message such as "File xxxx (file name) has been deleted. Please contact yyyy (webmaster) for restoration.", as shown in FIG. 2, for example. Alternatively, as shown in FIG. 3, a thumbnail image P generated from the image represented by the image data set S may also be included, in addition to the message.

Figure 4:
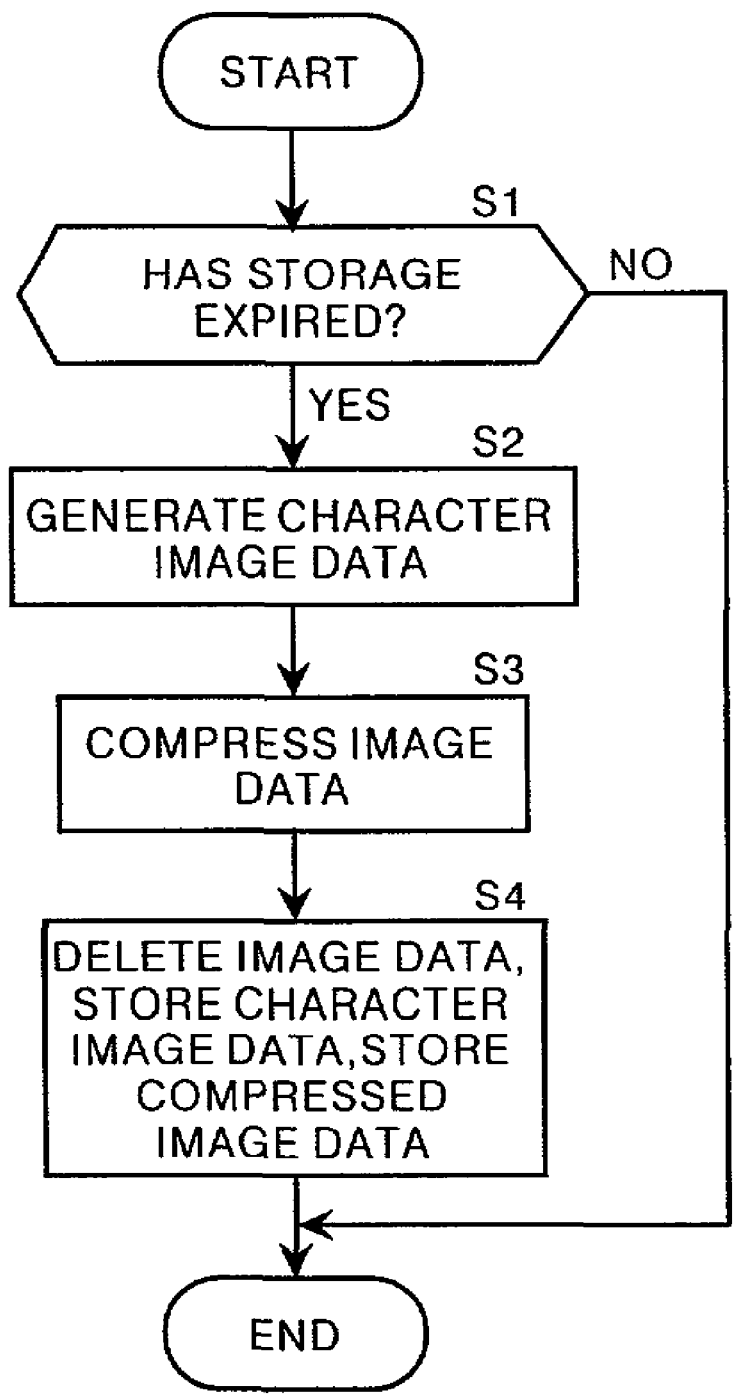
FIG. 4 is a flow chart showing the operation of the embodiment.

The operation of this embodiment will be explained next. FIG. 4 is a flow chart showing the operation of this embodiment. The confirmation means 4 judges whether or not the storage period has expired for the image data set S stored in the first recording means 1 (Step S1). If a result at Step S1 is affirmative, the character image generation means 5 generates the character image data set CS of the same format and having the same file name as the image data set S (Step S2). Meanwhile, the compression means 6 compresses the image data set S and generates the compressed image data set S1 (Step S3). The processing at Step S2 and S3 may be carried out at the same time or in the opposite order. The control means 7 deletes the image data set S from the first recording medium 1, stores the character image data set CS in the first recording medium 1, and stores the compressed image data set S1 in the second recording medium 2 (Step S4) to end the operation.

In the case where an access to the image data set S is attempted from the terminal 11 after deletion of the image data set S, the character image data set CS is referred to without rewriting of an html file by a webmaster of the Web page. The character image including the message shown in FIG. 2 or 3 is then displayed on the terminal 11. Therefore, an operator of the terminal 11 can confirm that the image data set S has been deleted and can request restoration of the image data set S from the webmaster if necessary.

Since the data amount of the character image data set CS is far smaller than the data amount of the image data set S, a storage space of the first recording medium 1 is not consumed considerably by the storage of the character image data set CS therein. Consequently, the storage space can be secured in the first recording medium 1 for an image data set that is newly stored therein.

What is claimed is:

1. An image filing method for managing storage of an image data set in a recording medium, the image filing method comprising the steps of:

generating a character image data set representing a same content of a character image of the same format and having the same file name as the image data set, when the image data set having the same file name is deleted;

storing the character image data set in the recording medium instead of the image data set; and wherein said character image data set comprises a message indicating at least one of: expiration of storage of the image data set from said recording medium, deletion of image data set from said recording medium, file name of the image data set, and address for accessing image data set.

2. An image filing method as defined in claim 1, further comprising the steps of:

generating a compressed image data set while compressing the image data set to be deleted; and storing the compressed image data set in another recording medium.

3. An image filing method as defined in claim 1, wherein image data set is deleted from said recording medium as a storage period expires.

4. An image filing method as defined in claim 1, wherein image data set deleted from said recording medium is stored in another physically separate recording medium when the character image data set is stored in said recording medium previously including the image data set.

5. An image filing method as defined in claimed 4, wherein character image data set indicates location of said image data set stored in the physically separate recording medium.

6. An image filing method as defined in claim 1, wherein said character image data set further comprises of a thumbnail image generated from reduction of the image represented by the deleted image data set.

7. An image filing apparatus for managing storage of an image data set in a recording medium, the image filing apparatus comprising:

character image generation means for generating a character image data set representing a same content of a character image of the same format and having the same file name as the image data set when the image data set having the same file name is deleted;

control means for storing the character image data set in the recording medium instead of the image data set; and wherein said character image data set comprises a message indicating at least one of: expiration of storage of the image data set from said recording medium, deletion of image data set from said recording medium, file name of the image data set, and address for accessing image data set.

8. An image filing apparatus as defined in claim 7, further comprising:

compression means for generating a compressed image data set while compressing the image data set to be deleted; and another recording medium for storing the compressed image data set.

9. An image filing apparatus as defined in claim 7, wherein image data set is deleted from said recording medium as a storage period expires.

10. An image filing apparatus as defined in claim 7, wherein image data set deleted from said recording medium is stored in another physically separate recording medium.

11. An image filing apparatus as defined in claim 10, wherein character image data set indicates location of said image data set stored in the physically separate recording medium when the character image data set is stored in said recording medium previously including the image data set.

12. An image filing apparatus as defined in claim 7, wherein said character image data set further comprises of a thumbnail image generated from reduction of the image represented by the deleted image data set.

13. A non-transitory computer-readable medium storing a program that causes a computer to execute an image filing method for managing storage of an image data set in a recording medium, comprising:

generating a character image data set representing a same content of a character image of the same format and having the same file name as the image data set, when the image data set having the same file name is deleted;

storing the character image data set in the recording medium instead of the image data set; and wherein the said character image data set comprises a message indicating at least one of: expiration of storage of the image data set from said recording medium, deletion of image data set from said recording medium, file name of the image data set, and address for accessing image data set.

14. A non-transitory computer-readable medium as defined in claim 13, the program further comprising the procedures of:

generating a compressed image data set while compressing the image data set to be deleted; and storing the compressed image data set in another recording medium.

15. A non-transitory computer-readable medium storing a program as defined in claim 13, wherein image data set is deleted from said recording medium as a storage period expires.

16. A non-transitory computer-readable medium storing a program as defined in claim 13, wherein image data set deleted from said recording medium is stored in another recording medium.

17. A non-transitory computer-readable medium storing a program as defined in claim 16, wherein character image data set indicates location of said image data set stored in another recording medium.

18. A non-transitory computer-readable medium storing a program as defined in claim 13, wherein said character image data set further comprises of a thumbnail image generated from reduction of the image represented by the deleted image data set.

\* \* \* \* \*